United States Patent
Min et al.

(10) Patent No.: US 11,735,709 B2
(45) Date of Patent: Aug. 22, 2023

(54) POSITIVE ELECTRODE FOR LITHIUM SECONDARY BATTERY, PREPARATION METHOD THEREOF, AND LITHIUM SECONDARY BATTERY INCLUDING SAME

(71) Applicants: LG Chem, Ltd., Seoul (KR); UNIST (Ulsan National Institute of Science and Technology), Ulsan (KR)

(72) Inventors: Ji Won Min, Daejeon (KR); Seok Koo Kim, Daejeon (KR); Youngsik Kim, Ulsan (KR); Janis Doelle, Daejeon (KR); Seongwoo Heo, Ulsan (KR); Youngjun Lim, Ulsan (KR)

(73) Assignees: UNIST (Ulsan National Institute of Science and Technology); LG Energy Solution, Ltd.

( * ) Notice: Subject to any disclaimer, the term of this patent is extended or adjusted under 35 U.S.C. 154(b) by 150 days.

(21) Appl. No.: 16/629,234

(22) PCT Filed: Jul. 9, 2018

(86) PCT No.: PCT/KR2018/007766
§ 371 (c)(1),
(2) Date: Jan. 7, 2020

(87) PCT Pub. No.: WO2019/013511
PCT Pub. Date: Jan. 17, 2019

(65) Prior Publication Data
US 2020/0227724 A1    Jul. 16, 2020

(30) Foreign Application Priority Data
Jul. 10, 2017 (KR) .......................... 10-2017-0087275

(51) Int. Cl.
| | | |
|---|---|---|
| H01M 4/04 | (2006.01) | |
| H01M 4/131 | (2010.01) | |
| H01M 4/1391 | (2010.01) | |
| H01M 4/505 | (2010.01) | |
| H01M 4/525 | (2010.01) | |
| H01M 4/62 | (2006.01) | |
| H01M 10/0525 | (2010.01) | |
| H01M 4/02 | (2006.01) | |

(52) U.S. Cl.
CPC ......... H01M 4/131 (2013.01); H01M 4/0404 (2013.01); H01M 4/0435 (2013.01); H01M 4/1391 (2013.01); H01M 4/505 (2013.01); H01M 4/525 (2013.01); H01M 4/62 (2013.01); H01M 10/0525 (2013.01); H01M 2004/028 (2013.01)

(58) Field of Classification Search
None
See application file for complete search history.

(56) References Cited

U.S. PATENT DOCUMENTS

| | | |
|---|---|---|
| 2005/0266150 A1 | 12/2005 | Yong et al. |
| 2007/0141468 A1 | 6/2007 | Barker |
| 2012/0104334 A1 | 5/2012 | Lee et al. |
| 2012/0295167 A1 | 11/2012 | Holzapfel et al. |
| 2013/0089486 A1 | 4/2013 | Ceder et al. |
| 2014/0329118 A1* | 11/2014 | Nagase .................. H01M 4/131 429/66 |
| 2016/0190561 A1 | 6/2016 | Son et al. |
| 2016/0233510 A1* | 8/2016 | Onodera ............... H01M 4/661 |
| 2016/0380266 A1* | 12/2016 | Suzuki .................. H01M 4/505 429/162 |
| 2017/0133676 A1 | 5/2017 | Kodato et al. |
| 2017/0187076 A1 | 6/2017 | Li et al. |

FOREIGN PATENT DOCUMENTS

| | | |
|---|---|---|
| CN | 102544496 A | 7/2012 |
| CN | 102683700 A | 9/2012 |
| CN | 102781826 A | 11/2012 |
| CN | 105470473 A | 4/2016 |
| JP | H10208730 A | 8/1998 |
| JP | 2978888 B1 | 11/1999 |
| JP | 2006514776 A | 5/2006 |
| JP | 2007520867 A | 7/2007 |

(Continued)

OTHER PUBLICATIONS

Arbi et al. "Characterization of Llthim Insertion into NASICON-Type Li1+xTi2-xAlx(PO4)3 and Its Electrochemical Behavior" (2010).*
Kim et al. "Effects of Capacity Ratios between Anode and Cathode on Electrochemical Properties for Lithium Polymer Battens" (Dec. 2014).*
Arbi et al. "Characterization of Lithium Insertion into NASICON-Type Li1+xTi2—xAlx(PO4)3 and Its Electrochemical Behavior" (2010).*
Delmas, et al., The Nasicon-Type Titanium Phosphates ATi2(PO4)3 (A=Li, Na) As Electrode Materials, Solid State Ionics, Sep. 1988, pp. 419-423, vol. 28-30, Part I, Elsevier Science Publishers B.V. (North-Holland Physics Publishing Division), Amsterdam, NL.

(Continued)

*Primary Examiner* — Austin Murata
(74) *Attorney, Agent, or Firm* — Lerner David LLP (57) ABSTRACT

Provided is a positive electrode for a lithium secondary battery, the positive electrode including a positive electrode mixture layer on a positive electrode current collector, wherein the positive electrode mixture layer includes a positive electrode active material and a lithium ion additive, the lithium ion additive is a lithium ion conductive ceramic material represented by Formula 1 below, and the lithium ion conductive ceramic material has a structure in which lithium ions are additionally inserted into vacancy sites of a NASICON-type (Na super ionic conductors-type) structure.

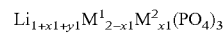

$$Li_{1+x1+y1}M^1{}_{2-x1}M^2{}_{x1}(PO_4)_3 \qquad \text{[Formula 1]}$$

In Formula 1, $M^1$ is at least one of Ti and Ge, $M^2$ is one or more selected from the group consisting Al, Cr, Ga, Fe, Sn, In, Lu, Y, and La, and $0 < x1 \leq 0.3$, and $1.7 \leq y1 \leq 2.0$.

11 Claims, 5 Drawing Sheets

(56) References Cited

FOREIGN PATENT DOCUMENTS

| JP | 2007287446 A | 11/2007 |
|---|---|---|
| JP | 2014026819 A | 2/2014 |
| JP | 2017117792 A | 6/2017 |
| KR | 20080076349 A | 8/2008 |
| KR | 20120046612 A | 5/2012 |
| KR | 101426350 B1 | 8/2014 |
| KR | 101615017 B1 | 4/2016 |
| KR | 20170067081 A | 6/2017 |
| KR | 20170067082 A | 6/2017 |
| WO | 2005031892 A2 | 4/2005 |
| WO | 2007030816 A2 | 3/2007 |
| WO | 2015190482 A1 | 12/2015 |

OTHER PUBLICATIONS

Extended European Search Report including Written Opinion for Application No. EP18831173.2, dated May 13, 2020, pp. 1-5.
International Search Report from Application No. PCT/KR2018/007766 dated Feb. 19, 2019, 2 pages.
K. Arbi et al., "Characterization of Lithium Insertion into NASICON-Type Li1+xTi2—xAlx(PO4)3 and Its Electrochemical Behavior," Journal of the Electrochemical Society, vol. 157, No. 6, Apr. 19, 2010, pp. A654-A659.
K. Arbi et al., "Local structure and lithium mobility in intercalated Li3AlxTi2—x(PO4)3 NASICON type materials: a combined neutron diffraction and NMR study," Royal Society of Chemistry, vol. 16, Jul. 2014, pp. 18397-18405.
Hideyuki Morimoto et al., "Preparation of lithium ion conducting solid electrolyte of NASICON-type Li1+xAlxTi2?x (PO4)3 (x = 0.3) obtained by using the mechanochemical method and its application as surface modification materials of LiCoO2 cathode for lithium cell", Journal of Power Sources, (May 2013), vol. 240, pp. 636-643.
Search Report dated Feb. 24, 2022 from Office Action for Chinese Application No. 201880042242.3 dated Mar. 2, 2022. 3 pgs. (see p. 1-2, categorizing the cited references).

\* cited by examiner

POSITIVE ELECTRODE FOR LITHIUM SECONDARY BATTERY, PREPARATION METHOD THEREOF, AND LITHIUM SECONDARY BATTERY INCLUDING SAME

CROSS-REFERENCE TO RELATED APPLICATIONS

The present application is a national phase entry under 35 U.S.C. § 371 of International Application No. PCT/KR2018/007766 filed Jul. 9, 2018, which claims the benefit of Korean Patent Application No. 10-2017-0087275, filed on Jul. 10, 2017, in the Korean Intellectual Property Office, the disclosures of which are incorporated herein in their entirety by reference.

TECHNICAL FIELD

The present disclosure generally relates to a positive electrode for a lithium secondary battery, a preparation method thereof, and a lithium secondary battery including the same.

BACKGROUND

The recent rapid spread of electronic devices using batteries, such as mobile phones, notebook computers and electric vehicles, has rapidly increased demand for secondary batteries having characteristics of small size and light weight and relatively high capacity. Particularly, a lithium secondary battery which is light in weight and has high energy density is attracting attention as a driving power source for portable devices. Accordingly, research and development efforts for improving the performance of lithium secondary batteries have been actively conducted.

A lithium secondary battery is a battery in which an electrolyte containing lithium ions is contained in an electrode assembly which includes a positive electrode having a positive electrode active material capable of intercalating/deintercalating lithium ions, a negative electrode having a negative electrode active material capable of intercalating/deintercalating lithium ions, and microporous separator interposed between the positive electrode and the negative electrode.

As a positive electrode active material of a lithium secondary battery, a lithium metal oxide is used, and as a negative electrode active material, lithium metal, lithium alloy, crystalline or amorphous carbon, carbon composite, and the like are used. The active material is applied on an electrode current collector with a proper thickness and length, or the active material itself is applied in a film form and wound or laminated together with a separator which is an insulator to form an electrode group. The electrode group is then placed in a can or a similar container, and an electrolyte is injected thereto to manufacture a secondary battery.

In order to develop a lithium secondary battery having high capacity, it is important to increase the efficiency of a negative electrode. Many materials used as irreversible additives, for example, silicon alloy series which have large irreversible capacity have been studied in order to increase the efficiency of a negative electrode. However, most of the materials have reversible charge/discharge at an operating voltage range, thereby negatively affecting the performance of a battery. Therefore, it is necessary to develop a lithium ion supplying material as an irreversible additive which does not contribute to charge/discharge.

DISCLOSURE OF CERTAIN EMBODIMENTS OF THE PRESENT DISCLOSURE

Technical Problem

An aspect of the present disclosure provides a positive electrode for a lithium secondary battery and a lithium secondary battery including the same, the positive electrode including a novel irreversible additive which provides lithium ions during an initial charge process but does not contribute to charge/discharge thereafter.

Technical Solution

According to an aspect of the present disclosure, there is provided a positive electrode for a lithium secondary battery, the positive electrode including a positive electrode mixture layer disposed on a positive electrode current collector, wherein the positive electrode mixture in the layer includes a positive electrode active material and a lithium ion additive, the lithium ion additive is a lithium ion conductive ceramic material represented by Formula 1 below, and the lithium ion conductive ceramic material has a structure in which lithium ions are additionally inserted into vacancy sites of a NASICON-type (Na super ionic conductors-type) structure.

$$Li_{1+x1+y1}M^1_{2-x1}M^2_{x1}(PO_4)_3 \quad [\text{Formula 1}]$$

In Formula 1, $M^1$ is at least one of Ti and Ge, $M^2$ is one or more selected from the group consisting Al, Cr, Ga, Fe, Sn, In, Lu, Y, and La, and $0 \leq x \leq 0.3$, and $1.7 \leq y \leq 2.0$.

According to another aspect of the present disclosure, there is provided a lithium secondary battery including a positive electrode, a negative electrode, and a separator interposed between the positive electrode and the negative electrode, and including the positive electrode described above.

According to another aspect of the present disclosure, there is provided a method for preparing a positive electrode for a lithium secondary battery, the method including forming, on a positive electrode current collector, a positive electrode mixture layer including a positive electrode active material and a lithium ion additive, wherein the lithium ion additive is a lithium ion conductive ceramic material represented by Formula 1 below, and the lithium ion conductive ceramic material has a structure in which lithium ions are additionally inserted into vacancy sites of a NASICON-type (Na super ionic conductors-type) structure.

$$Li_{1+x1+y1}M^1_{2-x1}M^2_{x1}(PO_4)_3 \quad [\text{Formula 1}]$$

In Formula 1, $M^1$ is at least one of Ti and Ge, $M^2$ is one or more selected from the group consisting Al, Cr, Ga, Fe, Sn, In, Lu, Y, and La, and $0 < x \leq 0.3$, and $1.7 \leq y \leq 2.0$.

Advantageous Effects

According to an embodiment of the present disclosure, by providing a positive electrode for a lithium secondary battery including a new irreversible additive which provides lithium ions during an initial charge process but does not contribute to charge/discharge thereafter, the efficiency of a negative electrode may be effectively increased and a lithium secondary battery of high capacity may be implemented.

BRIEF DESCRIPTION OF THE DRAWINGS

The following drawings attached to the specification illustrate certain examples of the present disclosure, and serve to illustrate certain technical concepts of the present disclosure to be further understood together with the detailed written description of the present disclosure given herein, and therefore the present disclosure should not be interpreted based solely on such drawings.

DISCUSSION OF VARIOUS EMBODIMENTS OF THE PRESENT DISCLOSURE

Hereinafter, the present disclosure will be described in more detail to allow for a clearer understanding of the present disclosure. It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the present disclosure, based on the principle that an inventor may properly define the meaning of the words or terms to best explain the present disclosure.

In one embodiment, a positive electrode for a lithium secondary battery of the present disclosure includes a positive electrode mixture layer disposed on a positive electrode current collector, and the positive electrode mixture layer includes a positive electrode active material and a lithium ion additive. The lithium ion additive may be a lithium ion conductive ceramic material represented by Formula 1 below.

[Formula 1]

In Formula 1, $M^1$ is at least one of Ti and Ge, $M^2$ is one or more selected from the group consisting Al, Cr, Ga, Fe, Sn, In, Lu, Y, and La, and $0<x\leq0.3$, and $1.7\leq y\leq2.0$.

The lithium ion conductive ceramic material of this embodiment of the present disclosure has a structure in which lithium ions are additionally inserted into vacancy sites of a NASICON-type (Na super ionic conductors-type) structure. In Formula 1, the molar ratio corresponding to y1 may be the molar ratio of the lithium ions additionally inserted into the vacancy sites.

Figure 1:
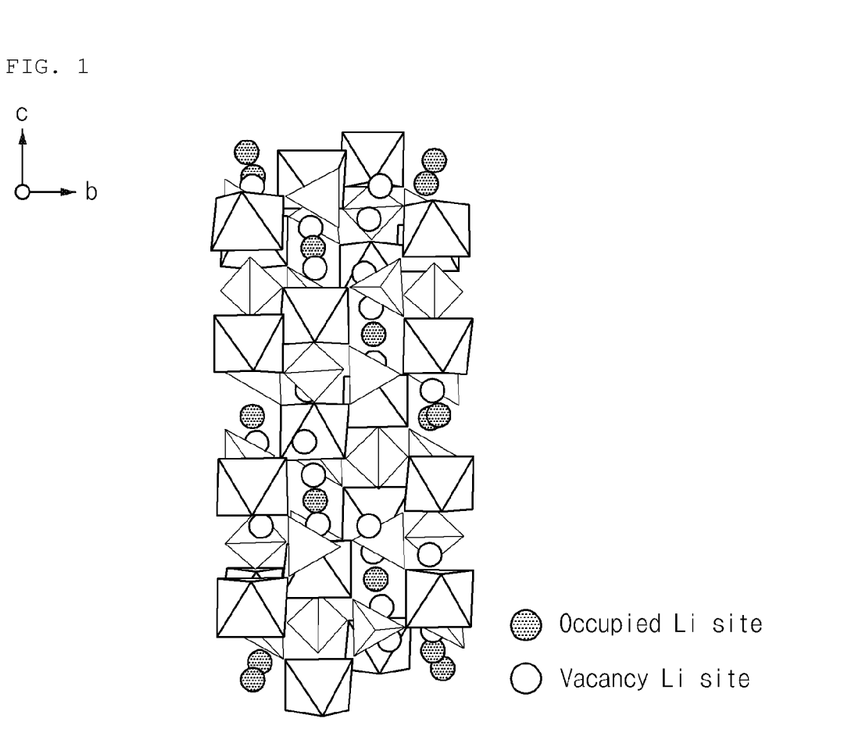
FIG. 1 is a schematic view showing the structure of a lithium ion conductive ceramic material having a NASICON-type (Na super ionic conductors-type) structure according to an embodiment of the present disclosure.

FIG. 1 is a schematic view showing the structure of a lithium ion conductive ceramic material having a NASICON-type structure.

Referring to FIG. 1, in the structure of a lithium ion conductive ceramic material having a NASICON-type structure, occupied Li sites are present and vacancy sites are present. The lithium ion conductive ceramic material according to the present disclosure includes lithium ions additionally inserted into the vacancy sites of the NASICON-type structure. The lithium ion conductive ceramic material having a NASICON-type structure in which lithium ions are additionally inserted may be prepared, for example, by adding n-butyl lithium to a lithium ion conductive ceramic material having a typical NASICON-type structure, for example, lithium titanium aluminum phosphate (LTAP), but is not necessarily limited thereto. Any lithium ion conductive ceramic material having lithium ions additionally inserted into vacancy sites of a NASICON-type structure may be used.

For example, one embodiment of the lithium ion additive of the present disclosure may be represented by Formula 2 below.

[Formula 2]

In Formula 2, $0<x2\leq0.3$, and $1.7\leq y2\leq2.0$.

In Formula 2 above, the molar ratio corresponding to y1 may be the molar ratio of the lithium ions additionally inserted into the vacancy sites.

In a specific example, the lithium ion additive may be $Li_3Ti_{1.7}Al_{0.3}(PO_4)_3$.

Continuing with this embodiment, the positive electrode of the present disclosure includes the lithium ion conductive ceramic material as a lithium ion additive, the lithium ion conductive ceramic material having a NASICON-type structure in which lithium ions are additionally inserted. That is, the positive electrode of this embodiment of the present disclosure includes a positive electrode active material, and a small amount of the lithium ion conductive ceramic material as a lithium ion additive.

Typically, a portion of lithium ions provided from a positive electrode may be consumed in forming a solid electrolyte interface (SEI) film on the surface of a negative electrode during an initial charge of the battery. Therefore, in order to maximize the use of the positive electrode active material, it is necessary to supplement lithium ions consumed in forming the solid electrolyte interface (SEI) film of the negative electrode. Accordingly, the present disclosure provides additional lithium ions which can be consumed in forming the solid electrolyte interface (SEI) film of the negative electrode. These additional lithium ions may be made available by adding the lithium ion conductive ceramic material as a lithium ion additive such that lithium ions of a positive electrode active material may be prevented from being consumed in forming the solid electrolyte interface (SEI) film during initial charge. In turn, by preserving the lithium ions of the positive electrode active material, this additive may increase reversible capacity by maximizing the use of the positive electrode active material.

Figure 2:
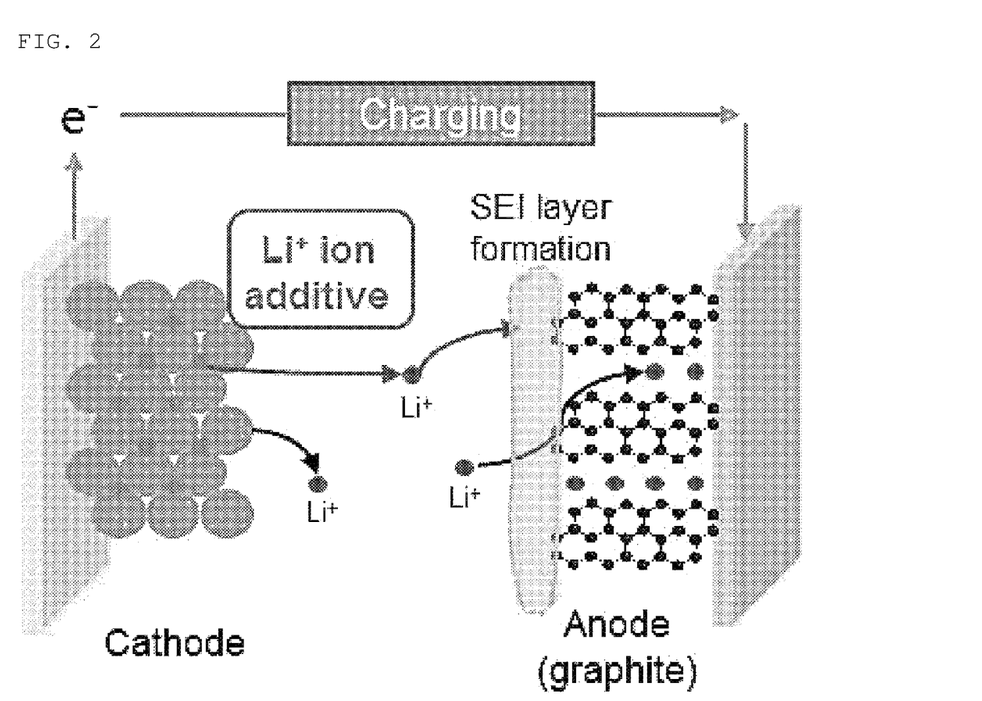
FIG. 2 is a schematic diagram of a lithium secondary battery using a lithium ion additive according to an embodiment of the present disclosure.

FIG. 2 is a schematic diagram of a lithium secondary battery using such a lithium ion additive according to an embodiment of the present disclosure.

Referring to FIG. 2, lithium ions provided from the lithium ion additive included in the positive electrode may be consumed in forming the solid electrolyte interface (SEI) film on the surface of the negative electrode during initial charging, which may leave the lithium ions provided from the positive electrode active material to contribute to subsequent charge/discharge.

In addition, since the lithium ion conductive ceramic material has high ionic conductivity, the lithium ion conductive ceramic material may have a characteristic of a solid electrolyte in subsequent cycles, thereby helping smooth conduction of lithium ions.

Meanwhile, a typical lithium ion additive used for increasing the efficiency of a negative electrode has reversible charge/discharge at about 3.0 V to 4.5 V (vs. Li/Li$^+$), which is the operating voltage range of most batteries, which can negatively affect the performance of a battery. By contrast, the additive of the present disclosure, such as the lithium ion conductive ceramic material which has a NASICON-type structure in which lithium ions are additionally inserted, may have an operating voltage range of about 2.5 V (vs. Li/Li$^+$). At this operating voltage, such an additive instead acts as an effective irreversible additive which provides lithium ions during an initial charge process, but may not affect charge/discharge at a charge/discharge voltage range of about 3.0 V to 4.5 V thereafter.

Accordingly, a positive electrode including the lithium ion conductive ceramic material of the present disclosure as a lithium ion additive, the lithium ion conductive ceramic material having a NASICON-type structure in which lithium ions are additionally inserted, may effectively increase the efficiency of the negative electrode and implement a lithium secondary battery of high capacity.

As the positive electrode active material of the present disclosure, a lithium transition metal oxide typically used as a positive electrode active material may be used. In one embodiment, a lithium transition metal oxide including a positive ion of at least one transition metal selected from the group consisting of nickel (Ni), cobalt (Co) and manganese (Mn) may be used. For example, a layered compound such as lithium cobalt oxide (LiCoO$_2$) and lithium nickel oxide (LiNiO$_2$), a lithium manganese oxide represented by the formulas Li$_{1+n}$Mn$_{2-n}$O$_4$ (wherein, n is 0 to 0.33), LiMnO$_3$, LiMn$_2$O$_3$, and LiMnO$_2$, an Ni-site type lithium nickel oxide represented by the formula LiNi$_{1-m}$M$^a_m$O$_2$ (wherein, M$^a$=Co, Mn, Al, Cu, Fe, Mg, B or Ga, and m=0.01 to 0.3), a lithium manganese complex oxide represented by the formulas LiMn$_{2-z}$M$^b_z$O$_2$ (wherein, M$^b$=Co, Ni, Fe, Cr, Zn or Ta, and z=0.01 to 0.1) or Li$_2$Mn$_3$M$^c$O$_8$ (wherein, M$^c$=Fe, Co, Ni, Cu or Zn), a lithium manganese complex oxide having a spinel structure and represented by LiNi$_r$Mn$_{2-r}$O$_4$ (wherein, r=0.01 to 1), a lithium iron phosphate compound (LiFePO$_4$), and the like may be used. However, the positive electrode active material of the present disclosure is not limited thereto.

Alternatively, as the positive electrode active material, a lithium transition metal complex oxide represented by Formula 3 below may be used.

[Formula 3]

In Formula 3, Q is any one or more elements selected from the group consisting of Al, Zr, Ti, Mg, Ta, Nb, Mo and Cr, and 0.9≤a≤1.5, 0≤b≤0.5, 0≤c≤0.5, and 0≤d≤0.1. More preferably, 0≤b+c≤0.7.

The positive electrode active material may more preferably include any one or more selected from the group consisting of lithium cobalt oxide (LiCoO$_2$), lithium nickel oxide (LiNiO$_2$), lithium manganese oxide (LiMn$_2$O$_4$), lithium iron phosphate compound (LiFePO$_4$), and lithium transition metal complex oxide represented by Formula 3 above. A battery of high capacity may be implemented using such forms of positive electrode active material.

The positive electrode active material and the lithium ion additive may be included in any amount desired. For example, the amount may be 80 wt % to 98 wt % based on the total weight of the positive electrode mixture layer, more preferably 85 wt % to 98 wt %, and most preferably 90 wt % to 95 wt %.

Further, the positive electrode active material and the lithium ion additive may be included in any weight ratio desired, such as for example, a weight ratio of 6:4 to 9.5:0.5, more preferably 8:2 to 9:1, and most preferably 8.5:1.5 to 9:1. When the positive electrode active material and the lithium ion additive are included in the above weight ratio range, the amount of lithium ions consumed in forming the solid electrolyte interface (SEI) film may be met by those supplied in the lithium ion additive so that the efficiency of the negative electrode may be increased more effectively, and reversible capacity may also be increased. Furthermore, since the ratio (N/P) of the capacity of the negative electrode to the capacity of the positive electrode is not affected, deterioration of battery performance due to a change in the ratio (N/P) of the capacity of the negative electrode to the capacity of the positive electrode may be minimized or prevented.

In one embodiment, the positive electrode mixture forming the layer includes the positive electrode active material and the lithium ion additive, and may further include a conductive material and a binder.

The conductive material is used to impart conductivity to an electrode, and any conductive material may be used without particular limitation as long as it has electron conductivity without causing a chemical change in a battery to be constituted. Specific examples of the conductive material may include graphite such as natural graphite or artificial graphite; a carbon-based material such as carbon black, acetylene black, Ketjen black, channel black, furnace black, lamp black, thermal black, and carbon fiber; metal powder or metal fiber such as copper, nickel, aluminum, and silver; a conductive whisker such as a zinc oxide whisker and a potassium titanate whisker; a conductive metal oxide such as titanium oxide; or a conductive polymer such as a polyphenylene derivative, and any one thereof or a mixture of two or more thereof may be used. The conductive material may be included in an amount of 1 wt % to 30 wt % based on the total weight of the positive electrode active material layer.

The binder serves to improve the bonding between, for example, positive electrode active material particles and the adhesion between the positive electrode active material and the positive electrode current collector. Specific examples of the binder may include polyvinylidene fluoride (PVDF), a polyvinylidene fluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene monomer (EPDM), a sulfonated EPDM, styrene-butadiene rubber (SBR), fluorine rubber, or various copolymers thereof, and any one thereof or a mixture of two or more thereof may be used. The binder may be included in an amount of 1 wt % to 30 wt % based on the total weight of a positive electrode mixture layer.

One embodiment of a method for preparing the positive electrode for a lithium secondary battery according to the present disclosure will be described.

In this embodiment, the method for preparing a positive electrode for a lithium secondary battery of the present disclosure includes forming, on a positive electrode current collector, a positive electrode mixture layer, the positive electrode mixture including a positive electrode active material and a lithium ion additive. The lithium ion additive is a lithium ion conductive ceramic material represented by Formula 1 below, and the lithium ion conductive ceramic material has a structure in which lithium ions are additionally inserted into vacancy sites of a NASICON-type structure.

[Formula 1]

In Formula 1, $M^1$ is at least one of Ti and Ge, $M^2$ is one or more selected from the group consisting Al, Cr, Ga, Fe, Sn, In, Lu, Y, and La, and $0<x\leq0.3$, and $1.7\leq y\leq2.0$.

The lithium ion additive may be prepared by adding n-butyl lithium to lithium titanium aluminum phosphate (LTAP) represented by Formula 4 below.

[Formula 4]

In Formula 4, $0<x3\leq0.3$.

By reacting lithium titanium aluminum phosphate (LTAP) represented by the Formula 4 with n-butyl lithium, a lithiated lithium titanium aluminum phosphate (LTAP) in which lithium ions are additionally inserted into vacancy sites of lithium titanium aluminum phosphate (LTAP) represented by Formula 4 may be prepared. The lithiated lithium titanium aluminum phosphate (LTAP) prepared as above in which lithium ions are additionally inserted may be, for example, $Li_3Ti_{1.7}Al_{0.3}(PO_4)_3$.

However, the method for preparing the lithium ion conductive ceramic material having a NASICON-type structure in which lithium ions are additionally inserted is not particularly limited as long as it is a method in which lithium ions are additionally inserted into vacancy sites of a lithium ion conductive ceramic material of a typical NASICON-type structure.

Continuing with this embodiment, the forming of the positive electrode mixture layer may include preparing a composition for forming a positive electrode, the composition first including a positive electrode active material and a lithium ion additive, and further including a conductive material and a binder. The types and contents of the positive electrode active material, the lithium ion additive, the conductive material, and the binder may be the same as those previously described.

A solvent for preparing the composition for forming a positive electrode may be a solvent commonly used in the art. Examples of the solvent may include dimethyl sulfoxide (DMSO), isopropyl alcohol, N-methylpyrrolidone (NMP), acetone, or water, and any one thereof or a mixture of two or more thereof may be used. An amount of the solvent used is sufficient if the solvent may dissolve or disperse the positive electrode active material coated with a radical polymer, the conductive material, and the binder in consideration of an applying thickness of a slurry and preparing yield, and may allow to have a viscosity which exhibits excellent thickness uniformity during the subsequent applying for the preparing of the positive electrode.

Next, continuing with this embodiment, the positive electrode may be prepared by applying the positive electrode mixture composition as a layer on the surface of the positive electrode current collector, followed by drying and rolling the positive electrode current collector, with the layer applied, to ultimately form the positive electrode.

The positive electrode current collector is not particularly limited as long as it has conductivity without causing adverse chemical changes in the battery. For example, stainless steel, aluminum, nickel, titanium, fired carbon, or aluminum or stainless steel that is surface-treated with one of carbon, nickel, titanium, silver, or the like may be used. In addition, the positive electrode current collector may typically have a thickness of 3 μm to 500 μm, and microscopic irregularities may be formed on the surface of the positive electrode current collector to improve the adhesion of the positive electrode active material. The positive electrode current collector, for example, may be used in various shapes such as that of a film, a sheet, a foil, a net, a porous body, a foam body, a non-woven fabric body, and the like.

In another embodiment of a method of forming a positive electrode, the positive electrode may be prepared by casting the positive electrode mixture composition to form a film on a separate support and then laminating the formed film onto the positive electrode current collector.

According to another embodiment of the present disclosure, there is provided an electrochemical device including the positive electrode. The electrochemical device may specifically be a battery, a capacitor or the like, and more specifically, may be a lithium secondary battery.

The lithium secondary battery specifically includes a positive electrode, a negative electrode disposed to face the positive electrode, a separator disposed between the positive electrode and the negative electrode, and an electrolyte. The positive electrode is as described above. Also, the lithium secondary battery may further selectively include a battery container accommodating an electrode assembly of the positive electrode, the negative electrode, and the separator, and a sealing member sealing the battery container.

In the lithium secondary battery, the negative electrode can include a negative electrode current collector and a negative electrode mixture layer disposed on the negative electrode current collector.

The negative electrode current collector is not particularly limited as long as it has high conductivity without causing a chemical change in the battery. For example, copper, stainless steel, aluminum, nickel, titanium, fired carbon, copper or stainless steel that is surface-treated with one of carbon, nickel, titanium, silver, and the like, and an aluminum-cadmium alloy may be used. Also, the negative electrode collector may typically have a thickness of 3 μm to 500 μm, and as in the case of the positive electrode current collector, microscopic irregularities may be prepared on the surface of the negative electrode current collector to improve the adhesion of a negative electrode active material. The negative electrode current collector may be used in various forms of such as a film, a sheet, a foil, a net, a porous body, a foam body, and a non-woven fabric body.

The negative electrode mixture layer may selectively include a binder and a conductive material in addition to the negative electrode active material.

The negative electrode active material may, in one embodiment, be a compound capable of reversibly intercalating and deintercalating lithium may be used. Specific examples of the negative electrode active material may include a carbonaceous material such as artificial graphite, natural graphite, graphitized carbon fiber, and amorphous carbon; a metallic compound alloyable with lithium such as Si, Al, Sn, Pb, Zn, Bi, In, Mg, Ga, Cd, a Si alloy, a Sn alloy, or an Al alloy; a metal oxide which may be doped and undoped with lithium such as $SiO_\beta$ $(0<\beta<2)$, $SnO_2$, vanadium oxide, lithium titanium oxide, and lithium vanadium oxide; or a composite including the metallic compound and the carbonaceous material such as a Si—C composite or a Sn—C composite, and any one thereof or a mixture of two or more thereof may be used. Also, a metallic lithium thin film may be used as the negative electrode active material. Furthermore, both low crystalline carbon and high crystalline carbon may be used as the carbon material. Typical examples of the low crystalline carbon may include soft carbon and hard carbon, and typical examples of the high crystalline carbon may include irregular, planar, flaky, spherical, or fibrous natural graphite or artificial graphite, Kish graphite, pyrolytic carbon, mesophase pitch-based carbon fiber, meso-carbon microbeads, mesophase pitches, and high-temperature sintered carbon such as petroleum or coal tar pitch derived cokes.

Also, the binder and the conductive material may be the same as those previously described in the description of the positive electrode.

The negative electrode mixture layer may be prepared by methods similar to those described above as to the positive electrode mixture layer. For example, the method may include applying, on the negative electrode current collector, the negative electrode active material along with a composition for forming a negative electrode which is prepared by selectively dissolving or dispersing the binder and the conductive material in the solvent, and drying the mixture applied to the negative electrode current collector. Alternatively, the layer may be prepared by casting the composition for forming a negative electrode as a film on a separate support and then laminating the film onto the negative electrode current collector.

In the lithium secondary battery according to an embodiment of the present disclosure, the ratio (N/P) of the capacity of the negative electrode (N) to the capacity of the positive electrode (P) may be 1.1 to 1.3, more preferably 1.1 to 1.2, and most preferably 1.1 to 1.15. When the N/P ratio satisfies the above range, the reversible charge/discharge of the lithium secondary battery may be more effectively maintained. In addition, when the N/P ratio is within the above range, the positive active material and the lithium ion additive included in the positive electrode are included in a weight ratio of 6:4 to 9.5:0.5, so that a proper amount of lithium ions as much as lithium ions consumed in forming the solid electrolyte interface (SEI) film may be additionally supplied from the lithium ion additive, thereby increasing the efficiency of the negative electrode more effectively, and increasing reversible capacity. Furthermore, since the N/P ratio is not affected, deterioration of battery performance due to a change in the N/P ratio (N/P) may be prevented.

Meanwhile, in the lithium secondary battery, a separator separates the negative electrode and the positive electrode and provides a movement path for lithium ions. Any separator may be used without particular limitation as long as it is typically used as a separator in a lithium secondary battery. Particularly, a separator having high moisture-retention ability for an electrolyte as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous nonwoven fabric, for example, a nonwoven fabric formed of high melting point glass fibers or polyethylene terephthalate fibers may be used. Furthermore, a coated separator including a ceramic component or a polymer material may be used to secure heat resistance or mechanical strength, and the separator having a single layer or multilayer structure may be selectively used.

Also, the electrolyte used in the present disclosure may include an organic liquid electrolyte, an inorganic liquid electrolyte, a solid polymer electrolyte, a gel-type polymer electrolyte, a solid inorganic electrolyte, or a molten-type inorganic electrolyte which may be used in the preparation of the lithium secondary battery, but the present disclosure is not limited thereto.

Specifically, the electrolyte may include an organic solvent and a lithium salt.

Any organic solvent may be used as the organic solvent without particular limitation so long as it may function as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; or a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2-C20 hydrocarbon group and may include a double-bond aromatic ring or ether bond); amides such as dimethylformamide; dioxolanes such as 1,3-dioxolane; or sulfolanes may be used as the organic solvent. Among these solvents, the carbonate-based solvent may be used, and, for example, a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) may be used. In this case, the performance of the electrolyte solution may be excellent when the cyclic carbonate and the chain carbonate are mixed in a volume ratio of about 1:1 to about 1:9.

The lithium salt may be used without particular limitation as long as it is a compound capable of providing lithium ions used in the lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, or $LiB(C_2O_4)_2$ may be used as the lithium salt. The lithium salt may be used in a concentration range of 0.1 M to 2.0 M. In a case in which the concentration of the lithium salt is included within the above range, since the electrolyte may have appropriate conductivity and viscosity, excellent performance of the electrolyte may be obtained and lithium ions may effectively move.

In order to improve lifetime characteristics of the battery, suppress the reduction in battery capacity, and improve discharge capacity of the battery, at least one additive, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further added to the electrolyte in addition to the electrolyte components. In this case, the additive may be included in an amount of 0.1 wt % to 5 wt % based on a total weight of the electrolyte.

As described above, since the lithium secondary battery including the positive electrode active material according to the present disclosure stably exhibits excellent discharge capacity, output characteristics, and capacity retention, the lithium secondary battery is suitable for portable devices, such as mobile phones, notebook computers, and digital cameras, and electric cars such as hybrid electric vehicles (HEV).

Thus, according to another embodiment of the present disclosure, a battery module including the lithium secondary battery as a unit cell and a battery pack including the battery module are provided.

The battery module or the battery pack may be used as a power source of at least one medium and large sized device of a power tool; electric cars including an electric vehicle (EV), a hybrid electric vehicle (HEV), and a plug-in hybrid electric vehicle (PHEV); or a power storage system.

The external shape of the lithium secondary battery of the present disclosure is not particularly limited, but may be a cylindrical shape using a can, a square shape, a pouch shape, a coin shape, and the like.

The lithium secondary battery according to the present disclosure may be used not only in a battery cell used as a power source of a small device but also as a unit cell in a medium and large sized battery module including a plurality of battery cells.

Hereinafter, examples of the present disclosure will be described in detail in such a manner that it may easily be carried out by a person with ordinary skill in the art to which the present disclosure pertains. The present disclosure may, however, be embodied in many different forms and should not be construed as being limited to the examples set forth herein.

PREPARATION EXAMPLE

LiCl, Al(NO$_3$)$_3$·9H$_2$O, NH$_4$H$_2$PO$_4$, and Ti(OC$_4$H$_9$)$_4$A were mixed in distilled water at a weight ratio of 5.51:11.25:34.51:57.85. After ball-milling for 24 hours, a precursor was prepared through spray-dry. The precursor was then heat-treated at 700° C. to synthesize Li$_{1.3}$Ti$_{1.7}$Al$_{0.3}$(PO$_4$)$_3$ powder. The synthesized powder and n-butyl lithium (solution in hexane) were reacted at a molar ratio of 1:6. The resulting material powder was filtered to obtain Li$_{1.3+1.7}$Ti$_{1.7}$Al$_{0.3}$(PO$_4$)$_3$.

Example 1

LiCoO$_2$, Li$_{1.3+1.7}$Ti$_{1.7}$Al$_{0.3}$(PO$_4$)$_3$ prepared in the above Preparation Example, carbon black, and PVdF binder were mixed in N-methylpyrrolidone solvent at a weight ratio of 81:9:5:5 (LCO:Li$_{1.3+1.7}$Ti$_{1.7}$Al$_{0.3}$(PO$_4$)$_3$=9:1) to prepare a composition for forming a first positive electrode. Then, the prepared composition was applied on one surface of an aluminum current collector, dried at 130° C., and then rolled to prepare a positive electrode.

Example 2

A positive electrode was prepared in the same manner as in Example 1 except that LiCoO$_2$, Li$_{1.3+1.7}$Ti$_{1.7}$Al$_{0.3}$(PO$_4$)$_3$ prepared in the above Preparation Example, carbon black, and PVdF binder were mixed at a weight ratio of 76.5:13.5:5:5 (LCO:Li$_{1.3+1.7}$Ti$_{1.7}$Al$_{0.3}$(PO$_4$)$_3$=8.5:1.5).

Example 3

A positive electrode was prepared in the same manner as in Example 1 except that LiCoO$_2$, Li$_{1.3+1.7}$Ti$_{1.7}$Al$_{0.3}$(PO$_4$)$_3$ prepared in the above Preparation Example, carbon black, and PVdF binder were mixed at a weight ratio of 72:18:5:5 (LCO:Li$_{1.3+1.7}$Ti$_{1.7}$Al$_{0.3}$(PO$_4$)$_3$=8:2).

Comparative Example 1

LiCoO$_2$, carbon black, and PVdF binder were mixed in N-methylpyrrolidone solvent at a weight ratio of 90:5:5 to prepare a composition for forming a first positive electrode. Then, the prepared composition was applied on one surface of an aluminum current collector, dried at 130° C., and then rolled to prepare a positive electrode.

Experimental Example

Evaluation of Battery Capacity

Each of the positive electrodes prepared in Examples 1 to 3 and Comparative Example 1 were used.

Also, natural graphite as a negative electrode active material, carbon black conductive material, and PVdF binder were mixed in N-methylpyrrolidone solvent at a weight ratio of 85:10:5 to prepare a composition for forming a negative electrode, and then the composition was applied on one surface of a copper current collector to prepare a negative electrode. The ratio (N/P) of the capacity of the negative electrode to the capacity of the positive electrode was 1.1.

A porous polyethylene separator was interposed between the positive electrode and the negative electrode which were prepared as above to prepare an electrode assembly, and then the electrode assembly was disposed in a case. Thereafter, an electrolyte was injected into the case to prepare a lithium secondary battery. The electrolyte was prepared by dissolving lithium hexafluorophosphate (LiPF$_6$) of 1.0 M concentration in an organic solvent made of ethylene carbonate/dimethyl carbonate/ethylmethyl carbonate (mixing volume ratio of EC/DMC/EMC=3/4/3).

Figure 3:
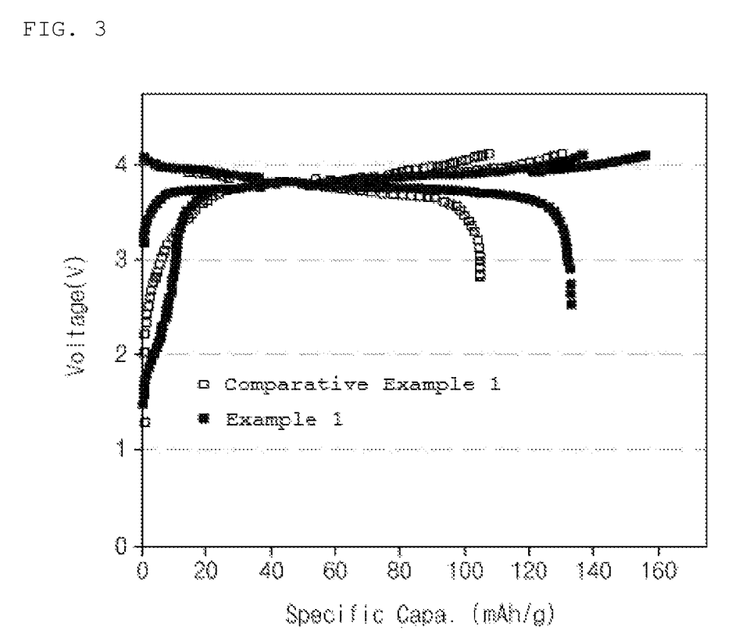
FIG. 3 is a graph showing the initial capacity of a lithium secondary battery cell using a positive electrode according to Example 1 and Comparative Example 1.

Each of the lithium secondary full cells prepared as above was charged at 25° C. in the CCCV mode until 0.1 C and 4.1 V were reached, and discharged at a constant current of 0.1 C until 2.5 V was reached. The charge/discharge steps were repeated a total of 30 times. The results are shown in Table 1 below and FIGS. 3 to 5.

TABLE 1

|  | C-rate | Charge capacity (mAh/g) | Discharge capacity (mAh/g) | Capacity retention rate (@30$^{th}$ cycle) |
| --- | --- | --- | --- | --- |
| Example 1 | 0.1 | 150 | 127 | 92.1% (@30$^{th}$ capacity 117 mAh/g) |
| Example 2 | 0.1 | 144 | 121 | 97.5% (@30$^{th}$ capacity 118 mAh/g) |
| Example 3 | 0.1 | 151 | 122 | 82.7% (@30$^{th}$ capacity 101 mAh/g) |
| Comparative Example 1 | 0.1 | 129 | 100 | 80.7% (@30$^{th}$ capacity 84 mAh/g) |

Referring to Table 1 above, in Examples 1 to 3, in which a lithium ion conductive ceramic material having a NASICON-type structure in which lithium ions are additionally inserted was mixed as an additive together with a positive electrode active material, it can be confirmed that the capacity was increased compared with Comparative Example 1 in which a lithium ion additive was not added, and the lifespan characteristic was also improved. Particularly, referring to FIG. 3, in the case of Example 1, in which a positive electrode active material and a lithium ion conductive ceramic material having a NASICON-type structure in which lithium ions are additionally inserted were added at a ratio of 9:1, it can be confirmed that the initial capacity was significantly increased.

Figure 4:
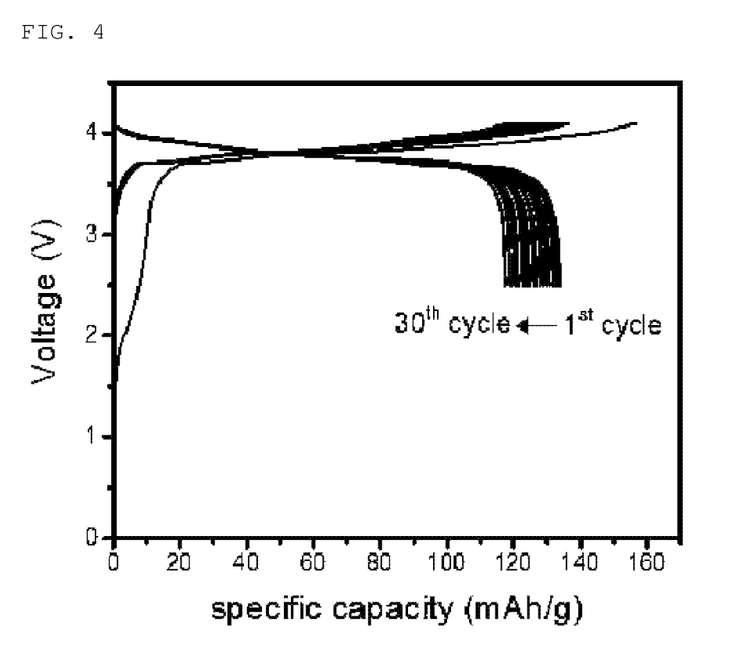
FIG. 4 is a graph showing the initial capacity and the capacity after 30 cycles of charge/discharge of a lithium secondary battery cell using a positive electrode according to Example 2.
Figure 5:
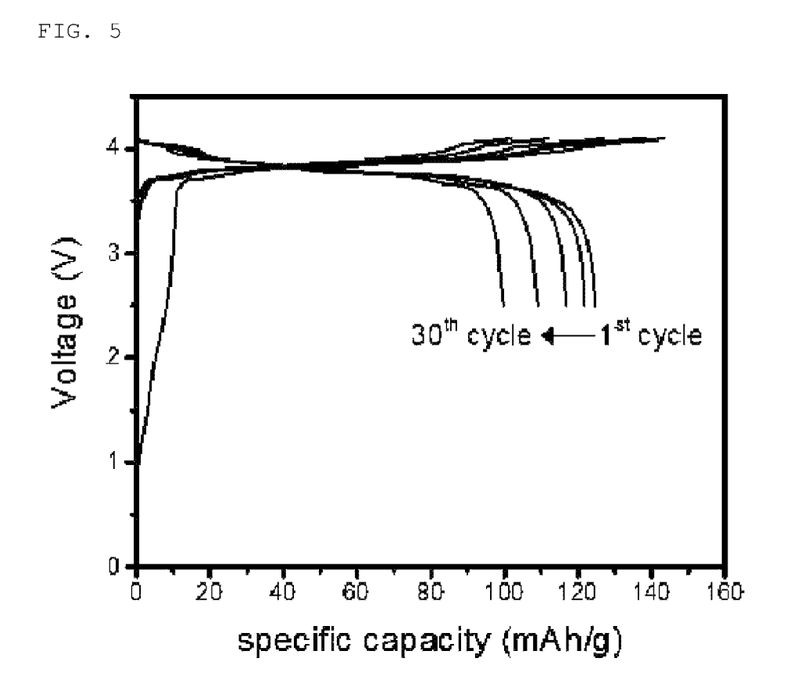
FIG. 5 is a graph showing the initial capacity and the capacity after 30 cycles of charge/discharge of a lithium secondary battery cell using a positive electrode according to Example 3.

In addition, referring to FIG. 4 and FIG. 5, in Example 1 and Example 2, in which a positive electrode active material and a lithium ion conductive ceramic material having a NASICON-type structure in which lithium ions are additionally inserted were added at a ratio of 8.5:1.5 to 9:1, the capacity was significantly increased, and the capacity retention rate was even better after the 30$^{th}$ cycle.

The invention claimed is:

1. A lithium secondary battery, comprising,
a positive electrode;
a negative electrode; and
a separator interposed between the positive electrode and the negative electrode;
wherein the positive electrode comprises a positive electrode mixture layer disposed on a positive electrode current collector, wherein
the positive electrode mixture layer includes a positive electrode active material and a lithium ion additive,
the lithium ion additive is a lithium ion conductive ceramic material represented by Formula 2 below, and
the lithium ion conductive ceramic material has a structure in which lithium ions are additionally inserted into vacancy sites of a NASICON-type (Na super ionic conductors-type) structure,
wherein the lithium ion additive acts as an effective irreversible additive at a charge/discharge voltage range of 3.0 V to 4.5 V,
wherein the positive electrode active material and the lithium ion additive are included in a weight ratio of 8.5:1.5 to 9:1,
wherein the positive electrode active material includes lithium cobalt oxide (LiCoO$_2$): and wherein a capacity retention rate after 30 cycles is 92.1-97.5%

$$Li_{1+x2+y2}Ti_{2-x2}Al_{x2}(PO_4)_3 \quad \text{[Formula 2]}$$

in Formula 2, 0<x2≤0.3, and 1.7≤y2≤2.0.

2. The lithium secondary battery of claim 1, wherein the lithium ion additive is Li$_3$Ti$_{1.7}$Al$_{0.3}$(PO$_4$)$_3$.

3. The lithium secondary battery of claim 1, wherein the positive electrode active material and the lithium ion additive are included in an amount of 80 wt % to 98 wt % based on the total weight of the positive electrode mixture layer.

4. The lithium secondary battery of claim 1, wherein the positive electrode mixture layer further comprises a binder.

5. The positive electrode for a lithium secondary battery of claim 1, wherein the ratio (N/P) of the capacity of the negative electrode (N) to the capacity of the positive electrode (P) is 1.1 to 1.3.

6. A method for preparing a positive electrode for a lithium secondary battery, the method comprising:
forming, on a positive electrode current collector, a positive electrode mixture layer including a positive electrode active material and a lithium ion additive, wherein
the lithium ion additive is a lithium ion conductive ceramic material represented by Formula 2 below, and
the lithium ion conductive ceramic material has a structure in which lithium ions are additionally inserted into vacancy sites of a NASICON-type (Na super ionic conductors-type) structure,
wherein the lithium ion additive acts as an effective irreversible additive at a charge/discharge voltage range of 3.0 V to 4.5 V, and
wherein the positive electrode active material and the lithium ion additive are included in a weight ratio of 8.5:1.5 to 9:1
wherein the positive electrode active material includes lithium cobalt oxide (LiCoO$_2$): and wherein a capacity retention rate after 30 cycles is 92.1-97.5%

$$Li_{1+x2+y2}Ti_{2-x2}Al_{x2}(PO_4)_3 \quad \text{[Formula 2]}$$

in Formula 2, 0<x2≤0.3, and 1.7≤y2≤2.0.

7. The method of claim 6, wherein the lithium ion additive is prepared by adding n-butyl lithium to lithium titanium aluminum phosphate (LTAP) represented by Formula 4 below:

$$Li_{1+x3}Ti_{2-x3}Al_{x3}(PO_4)_3 \quad \text{[Formula 4]}$$

in Formula 4, 0<x3<0.3.

8. The method of claim 6, wherein the lithium ion additive is Li$_3$Ti$_{1.7}$Al$_{0.3}$(PO$_4$)$_3$.

9. The method of claim 6, wherein the positive electrode active material and the lithium ion additive are included in an amount of 80 wt % to 98 wt % based on the total weight of the positive electrode mixture layer.

10. The method of claim 6, wherein the forming step comprises:
disposing the positive electrode mixture on a surface of the positive electrode current collector;
drying the positive electrode mixture; and
rolling the positive electrode mixture and positive electrode current collector.

11. The method of claim 6, wherein the forming step comprises:
disposing the positive electrode mixture on a surface of a support material to form a film on the support material; and
laminating the formed film onto the positive electrode current collector.

* * * * *